US008928948B2

(12) United States Patent
Eschbach et al.

(10) Patent No.: US 8,928,948 B2
(45) Date of Patent: Jan. 6, 2015

(54) METHOD OF CREATING NON-PATTERNED SECURITY ELEMENTS

(75) Inventors: Reiner Eschbach, Webster, NY (US); Martin S. Maltz, Rochester, NY (US); Edward Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 157 days.

(21) Appl. No.: 12/957,590

(22) Filed: Dec. 1, 2010

(65) Prior Publication Data

US 2012/0140290 A1 Jun. 7, 2012

(51) Int. Cl.
*G06K 15/02* (2006.01)
*B41M 3/10* (2006.01)

(52) U.S. Cl.
CPC ........ *B41M 3/10* (2013.01)
USPC ........ 358/3.28

(58) Field of Classification Search
USPC ........ 358/3.28
See application file for complete search history.

(56) References Cited

U.S. PATENT DOCUMENTS 5,734,752 A 3/1998 Knox
8,111,432 B2 * 2/2012 Eschbach et al. ........ 358/3.28
2007/0017990 A1 1/2007 Katsurabayashi et al.
2008/0068625 A1 * 3/2008 Ng et al. ........ 358/1.9
2008/0302263 A1 12/2008 Eschbach et al.
2008/0304696 A1 12/2008 Eschbach et al.
2008/0305444 A1 * 12/2008 Eschbach et al. ........ 430/495.1
2009/0195797 A1 8/2009 Mestha et al.
2009/0225340 A1 * 9/2009 Hatori ........ 358/1.9
2009/0262400 A1 * 10/2009 Eschbach et al. ........ 358/3.28
2010/0290065 A1 * 11/2010 Shestak ........ 358/1.9

* cited by examiner

*Primary Examiner* — Vincent Rudolph
*Assistant Examiner* — Kevin Ky
(74) *Attorney, Agent, or Firm* — Fay Sharpe LLP

(57) ABSTRACT

Described herein is a method to encode infrared (IR) security watermarks using a named color dictionary within a PDL in a device independent manner. A set of colors is chosen that lies within the common gamut of printing devices and then defined in a device-independent color space. For each color and output device, a metameric pair of device colorant values corresponding to minimum and maximum black (K) is obtained using inversion techniques. These extremes are selected in order to obtain the maximum perceivable IR signal. The metameric pair sets are processed to extract a smaller subset that satisfies certain criteria, including bounds on the K difference, total ink area coverage, and deviation from the neutral axis. The final data is then stored in resource files that link fixed device-independent IR color names to pairs of variable device-dependent colorant values.

20 Claims, 4 Drawing Sheets

METHOD OF CREATING NON-PATTERNED SECURITY ELEMENTS

BACKGROUND

The exemplary embodiments described herein relate generally to the useful manipulation of infrared components found in toners as commonly utilized in various printer and electrostatographic print environments. More particularly, the teachings provided herein relate to an improved realization of infrared encoding of data elements or infrared marks across devices.

It is desirable to have a way to provide for the detection of counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is particularly desirable that this solution be obtained without physical modification to the printing device and without the need for costly special materials and media. And importantly it is desirable that the approach can be ported across different devices.

Watermarking is a common way to ensure security in digital documents. Many watermarking approaches exist with different trade-offs in cost, fragility, robustness, etc. Note that here and in the following we are using the common generalized definition of watermark that goes beyond the original paper-based watermark and also includes other materials or digital encoding. One prior art approach is to use special ink rendering where the inks are invisible under standard illumination. These inks normally respond to light outside the visible range and can be made visible either by wavelength conversion or by appropriate sensors. Examples of such extra-spectral techniques include UV (ultraviolet) and IR (infrared). This traditional approach is to render the encoded data with special inks that are not visible under normal light but have strong distinguishing characteristics under the special spectral illumination. Determination of the presence or absence of such encoding may be thereby subsequently performed using an appropriate light source and detector. One example of this approach is found in U.S. Patent Publication No. 2007/0017990 to Katsurabayashi et al., which is herein incorporated by reference in its entirety for its teachings. However, these special inks and materials are often difficult to incorporate into standard electro-photographic or other non-impact printing systems like solid ink printers, either due to cost, availability or physical/chemical properties. This, in turn, discourages their use in variable data printing arrangements, such as for redeemable coupons or other personalized printed media for example.

Another approach taken is where copy control is provided by digital watermarking, as for example U.S. Pat. No. 5,734,752 to Knox, where there is provided a method for generating data encoding in the form of a watermark in a digitally reproducible document which are substantially invisible when viewed. The method generally includes the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

Current methods of providing infrared security elements are based on metameric rendering. However, since metameric matches are strongly dependent on actual machines, only an explicit, same angle halftone method was found portable enough between production level machines. This explicit halftoning can be implemented through a PostScript Pattern Ink construct, as described, for example, in U.S. Patent Publication No. 2008/0302263 to Eschbach et al., which is herein incorporated by reference in its entirety for its teachings. These different explicit patterns have a strong periodic appearance and are collected as user available color palette, e.g., in VIPP (Variable-Data Intelligent PostScript Printware). However, all the colors in the palette are compromises, and it is desirable to produce better IR active colors that have better visual and infrared properties.

Infrared encoding can be obtained by alternating between different metameric renderings of a "color." A problem in those scenarios was the "color" had to be spatially varying to hide any visual mismatch between the renderings. Additionally, the "color" had to be reasonably stable across devices and thus compromises had to be made, leading to strongly textured "colors," described as "Pattern Ink" in a PostScript construct.

These patterned colors allow the creator a larger freedom in document design by being able to "hide" any infrared data inside the color field. These patterned inks, however, do not suffice for several design problems where, for example, a corporate letterhead or a photo book is created. For these instances a more homogeneous color is needed. However, homogeneous colors cannot be created using the current IR color approach.

What is needed is a different approach to IR color generation that on the creation side is machine in-dependent but on the rendering side is tuned to the actual machine response. Being able to specify a color (i.e., visual color) that will look the same on different printers is an important attribute of job portability. This color may be rendered with a different machine dependent colorant mixture as stored as a resource on the digital front end (DFE). For the IR case, it is helpful therefore to define a machine resource so that the colors also have minimal IR response, i.e., color pairs that show specific metameric properties.

INCORPORATION BY REFERENCE

The following patents/applications, the disclosures of each being totally incorporated herein by reference, are mentioned:

US Patent Publication No. US 2008/0304696, published Dec. 11, 2008, and entitled INFRARED ENCODING FOR EMBEDDING MULTIPLE VARIABLE DATA INFORMATION COLLOCATED IN PRINTED DOCUMENTS;

US Patent Publication No. US 2008/0302263, published Dec. 11, 2008, and entitled INFRARED ENCODING OF SECURITY ELEMENTS USING STANDARD XEROGRAPHIC MATERIALS.

BRIEF DESCRIPTION

Described herein is a method of encoding IR security marks by creating named color sets for different machines that are based on using identical RGB or L*a*b* nodes in the color profiling tools to create a preferred—in terms of infrared response—list of usable colors. By restricting the color selection to common nodes of the standard color transformation tables, it is thus possible to maintain color look and feel across different devices as well as minimizing any error from the calibration. Note that the security features consist of metameric matches, which are extremely sensitive to calibration precisions.

In one embodiment, a method of encoding infrared security watermarks with a set of printing devices is provided. The method includes choosing a set of colors that lies within a common gamut of the printing devices and is defined within a device-independent color space. For each color and printing device, a metameric pair of device colorant values corresponding to minimum and maximum black (K) values is selected. The metameric pair sets are processed to extract a smaller subset that satisfies a given set of criteria. Data associated with the processing step is then stored in resource files in a database that link fixed device-independent infrared color names to pairs of variable device-dependent colorant values.

In another embodiment, an apparatus for encoding infrared security watermarks with a set of printing devices is provided. The apparatus generally includes a controller that is operative to: choose a set of colors that lies within a common gamut of the printing devices and is defined within a device-independent color space; for each color and printing device, obtain a metameric pair of device colorant values corresponding to minimum and maximum black (K) values is selected; and process the metameric pair sets to extract a smaller subset that satisfies a given set of criteria. The apparatus may further include a database for storing data associated with the processing step in resource files that link fixed device-independent infrared color names to pairs of variable device-dependent colorant values

DETAILED DESCRIPTION

Figure 1:
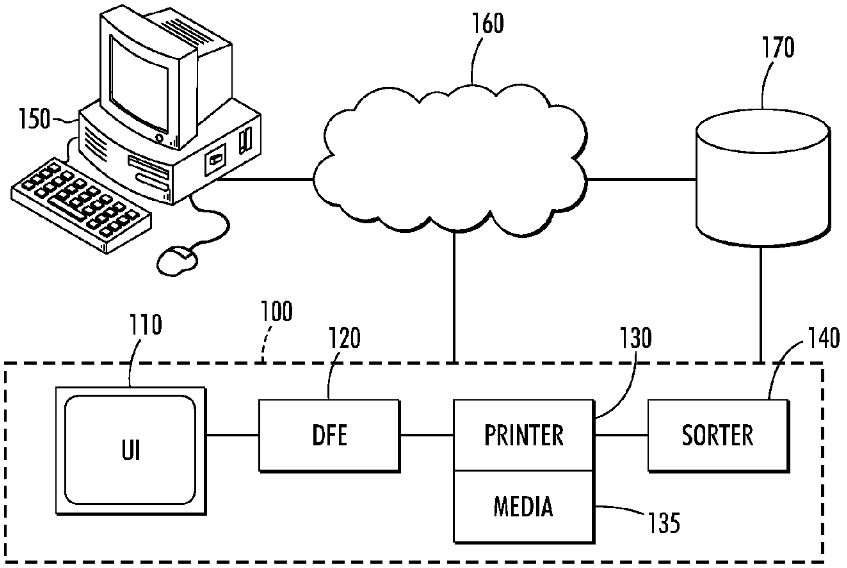
FIG. 1 is block diagram of a printing system suitable for implementing one or more aspects of the exemplary method described herein.

For a general understanding of the present disclosure, reference is made to the drawings. In the drawings, like reference numerals have been used throughout to designate identical elements. In describing the present disclosure, the following terms have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

The "RGB color model" is an additive color model in which red, green, and blue light are added together in various ways to reproduce a broad array of colors. The name of the model comes from the initials of the three additive primary colors, red, green, and blue. The main purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus an RGB value does not define the same color across devices without some kind of color management.

The "CMYK color model" is a subtractive color model, used in color printing, and is also used to describe the printing process itself. CMYK refers to the four inks used in some color printing: cyan, magenta, yellow, and black.

"Colorant" refers to one of the fundamental subtractive C, M, Y, K, primaries, which may be realized in formulation as, liquid ink, solid ink, dye, or electrostatographic toner. A "colorant mixture" is a particular combination of C, M, Y, K colorants.

An "infrared mark" is a watermark embedded in the image that has the property of being relatively indecipherable under normal light, and yet decipherable under IR (Infrared) illumination by appropriate IR sensing devices, such as IR cameras.

"Metameric" rendering/printing is the ability to use multiple colorant combinations to render a single visual color, as can be achieved when printing with more than three colorants.

With reference now to FIG. 1, a printing system (or image rendering system) 100 suitable for implementing aspects of the exemplary embodiments described herein is illustrated. The word "printer" and the term "printing system" as used herein encompass any apparatus and/or system, such as a digital copier, xerographic and reprographic printing systems, bookmaking machine, facsimile machine, multi-function machine, ink-jet machine, continuous feed, sheet-fed printing device, etc. which may contain a print controller and a print engine and which may perform a print outputting function for any purpose.

The printing system 100 generally includes a user interface 110, a digital front end (DFE) controller 120, and at least one print engine 130. The print engine 130 has access to print media 135 of various sizes and cost for a print job. A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100. A sorter 140 operates after a job is printed by the print engine 130 to manage arrangement of the hard copy output, including cutting functions. A user can access and operate the printing system 100 using the user interface 110 or via a workstation 150. The workstation 150 communicates with the printing system 100 via a communications network 160. A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 2:
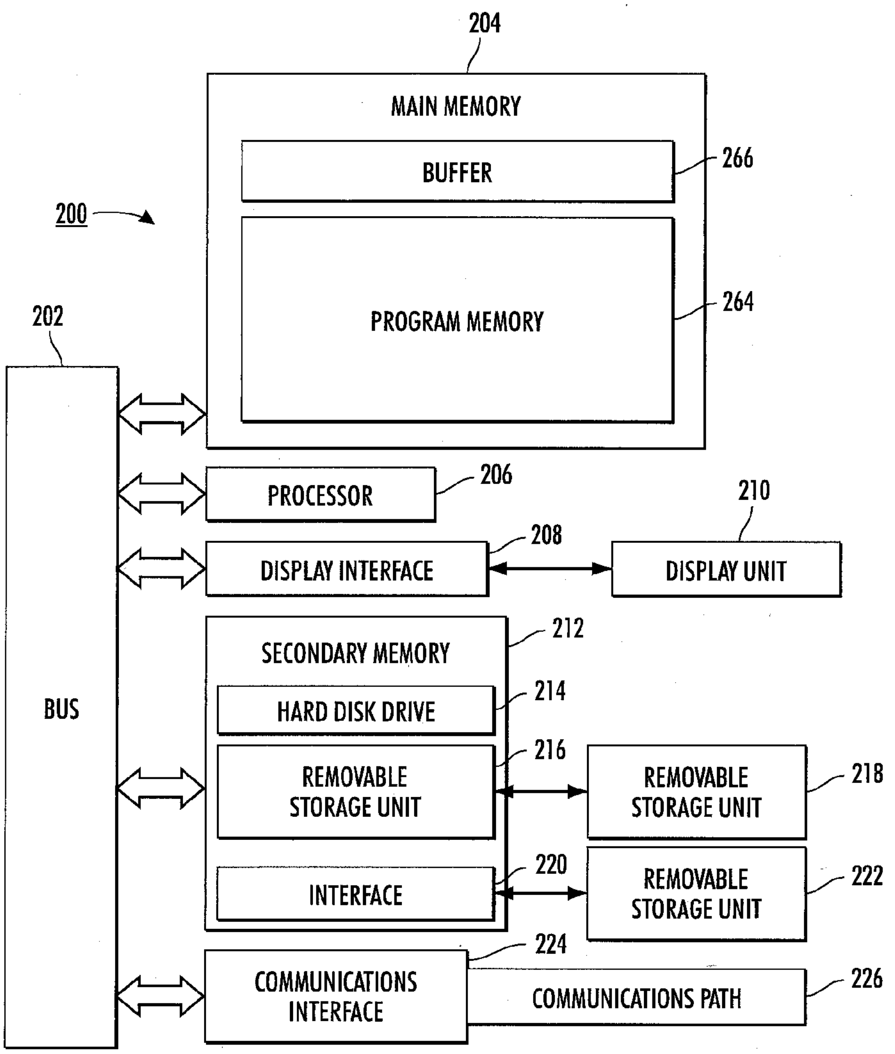
FIG. 2 is a block diagram of a DFE controller useful for implementing one or more aspects of the exemplary method described herein.

Turning now to FIG. 2, an exemplary DFE controller 200 is shown in greater detail. The DFE 200 includes one or more processors, such as processor 206 capable of executing machine executable program instructions. In the embodiment shown, the processor is in communication with a bus 202 (e.g., a backplane interface bus, cross-over bar, or data network). The DFE 200 also includes a main memory 204 that is used to store machine readable instructions. The main memory also being capable of storing data. Main memory may alternatively include random access memory (RAM) to support reprogramming and flexible data storage. Buffer 266 is used to temporarily store data for access by the processor. Program memory 264 includes, for example, executable programs that implement the embodiments of the methods described herein. The program memory 264 stores at least a subset of the data contained in the buffer.

The DFE 200 includes a display interface 208 that forwards data from communication bus 202 (or from a frame buffer not shown) to a display 210. The DFE 200 also includes a secondary memory 212 includes, for example, a hard disk drive 214 and/or a removable storage drive 216, which reads and writes to removable storage 218, such as a floppy disk, magnetic tape, optical disk, etc., that stores computer software and/or data. The secondary memory 212 alternatively includes other similar mechanisms for allowing computer programs or other instructions to be loaded into the computer system. Such mechanisms include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable units and interfaces which allow software and data to be transferred.

The DFE 200 includes a communications interface 224, which acts as both an input and an output to allow software and data to be transferred between the DFE 200 and external devices. Examples of a communications interface include a modem, a network interface (such as an Ethernet card), a communications port, a PCMCIA slot and card, etc.

Computer programs (also called computer control logic) may be stored in main memory 204 and/or secondary memory 212. Computer programs may also be received via a communications interface 224. Such computer programs, when executed, enable the computer system to perform the features and capabilities provided herein. Software and data transferred via the communications interface can be in the form of signals which may be, for example, electronic, electromagnetic, optical, or other signals capable of being received by a communications interface. These signals are provided to a communications interface via a communications path (i.e., channel) which carries signals and may be implemented using wire, cable, fiber optic, phone line, cellular link, RF, or other communications channels.

Part of the data generally stored in secondary memory 212 for access during DFE operation is a set of translation tables that convert an incoming color signal into a physical machine signal. In our case, this color signal can be expressed either as a calorimetric value, usually three components as L*a*b*, RGB, XYZ, etc. into physical exposure signals for the four toners cyan, magenta, yellow and black. These tables are commonly created outside of the DFE and downloaded, but are optionally created inside the DFE in a so-called characterization step.

Figure 3:
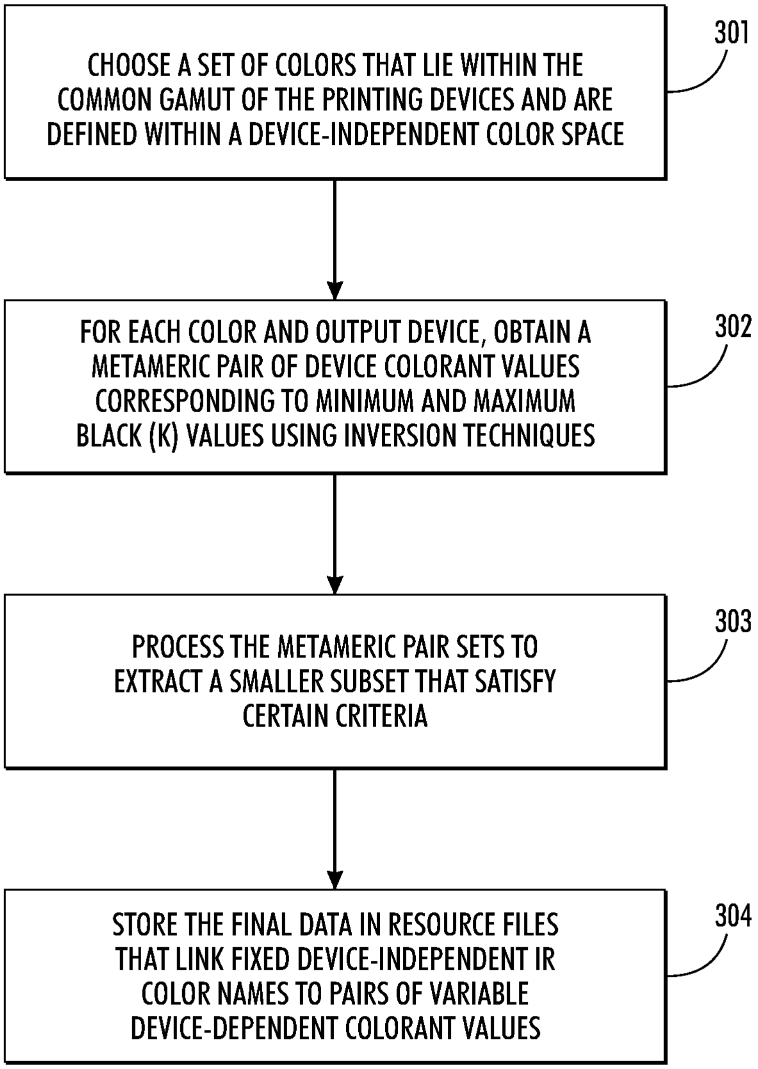
FIG. 3 is a flow chart showing an exemplary method of encoding IR security watermarks.

We turn now to FIG. 3, which illustrates a flow chart of an exemplary method of encoding IR security watermarks using the existing construct of a named color dictionary within a PDL in a device independent fashion.

One of the important processes executed by the DFE 200 is color rendering, i.e., the above described conversion of a digital color description commonly in some calorimetric color space into a machine specific physical colorant combination that will be deposited onto the physical substrate in the actual print production. That is, a set of colors that lies within a common gamut of the printing devices and is defined within a device-independent color space is chosen (301).

This transformation of an input color to a physical colorant combination is done following the standard ICC (International Color Consortium) implementation. In this implementation input colors are related to output physical colorant combinations using transformation tables. The precise way of this transformation is not essential for the described exemplary embodiment other than the fact that the transformation will involve some form of interpolation between measured values. In essence, it is impractical and inefficient to store all possible color to colorant combinations. For example, a standard RGB image at eight bits can have 256×256×256, or approximately 16 million, colors and that RGB does not yet cover all colors that can be seen by a human.

Consequently, the color to colorant transformation may be done in a table look-up manner, in which a subset of the possible color to colorant combinations is measured and the result of this subset is stored inside the DFE 200. All other colors will then be determined by interpolating between the known and measured values. For the purpose of this exemplary embodiment, it is not necessary to understand the exact steps of creating the measured color to colorant combinations, other than understanding that the transformation is an underdetermined problem for most combinations. This can easily be understood when considering that the input color space has three components and the output colorant space has four or more components. There are thus entire sets of physical colorant combinations that will give the same visual color, except for degenerate cases at the boundary or other singularities of real systems.

Mathematically, this can be expressed by the mapping:

$$\begin{bmatrix} R \\ G \\ B \end{bmatrix} \Rightarrow \left\{ \begin{bmatrix} C_1 \\ M_1 \\ Y_1 \\ K_1 \end{bmatrix}, \begin{bmatrix} C_2 \\ M_2 \\ Y_2 \\ K_2 \end{bmatrix}, \begin{bmatrix} C_3 \\ M_3 \\ Y_3 \\ K_3 \end{bmatrix}, \ldots, \ldots, \begin{bmatrix} C_N \\ M_N \\ Y_N \\ K_N \end{bmatrix} \right\},$$

where $N \geq 1$. The case of $N=1$ is the degenerate case mentioned above, i.e., mapping "pure" colors. Normally, the mappings are picked so as to form the basis for the ICC (International Color Consortium) profile, where the selection is done based on other criteria, such as preferred amount of undercolor removal. In essence, standard color printing will now pick one of the N physical colorant combinations to use as the color to colorant transformation, effectively ignoring the remaining N−1 possibilities.

At this point, it is noted that all printers typically use the same RGB grid for their profiles; thus, it is possible to use this common grid for the subsequent color definitions. It is also noted that it is not necessary to have any knowledge, or make any assumption about, the spacing, distribution or separability of these RGB triplets in the continuous RGB color space.

There is one other piece of information available regarding this discrete set of RGB triplets. That is, in terms of interpolation accuracy, these points will have the best quality of all general RGB triplets, since all other triplets will be obtained by secondary interpolation from this discrete basic set. In general, the errors caused by this secondary interpolation are small, but since, for the purpose of these exemplary embodiments, strongly metameric colors are involved, any possible sources of error should be avoided.

Without loss of generality, it is possible to sort the N possible colorant combinations in the order of increasing K component and thus know that combination “1” has the lowest amount of K colorant and combination “N” has the highest amount. All N possible colorant combinations define a metameric set of colorants, meaning that different physical colorant combinations yield the same visual perception, or color. From the large set of (non-unique) color mappings and for each color and output device, a metameric pair of device colorant values corresponding to minimum and maximum black (K) is selected, i.e., $[C,M,Y,K]_1$ and $[C,M,Y,K]_N$ (302). These extremes are selected in order to obtain the maximum perceivable IR signal. The complete set of mappings can be reduced by making some assumptions that can easily be explained.

First, it is assumed that the only interest is in the relative IR strengths of the metameric pair and not in its absolute values. This relative strength assumption makes it possible to consider each RGB triplet independent of all other triplets. It is understood that a different selection mechanism might be used. For example, it is possible to select 60% of maximum, or $[C,M,Y,K]_{1+m}$, $[C,M,Y,K]_{N-n}$, where these selections will in general have a lower IR contrast and thus are generally not preferred.

Figure 4:
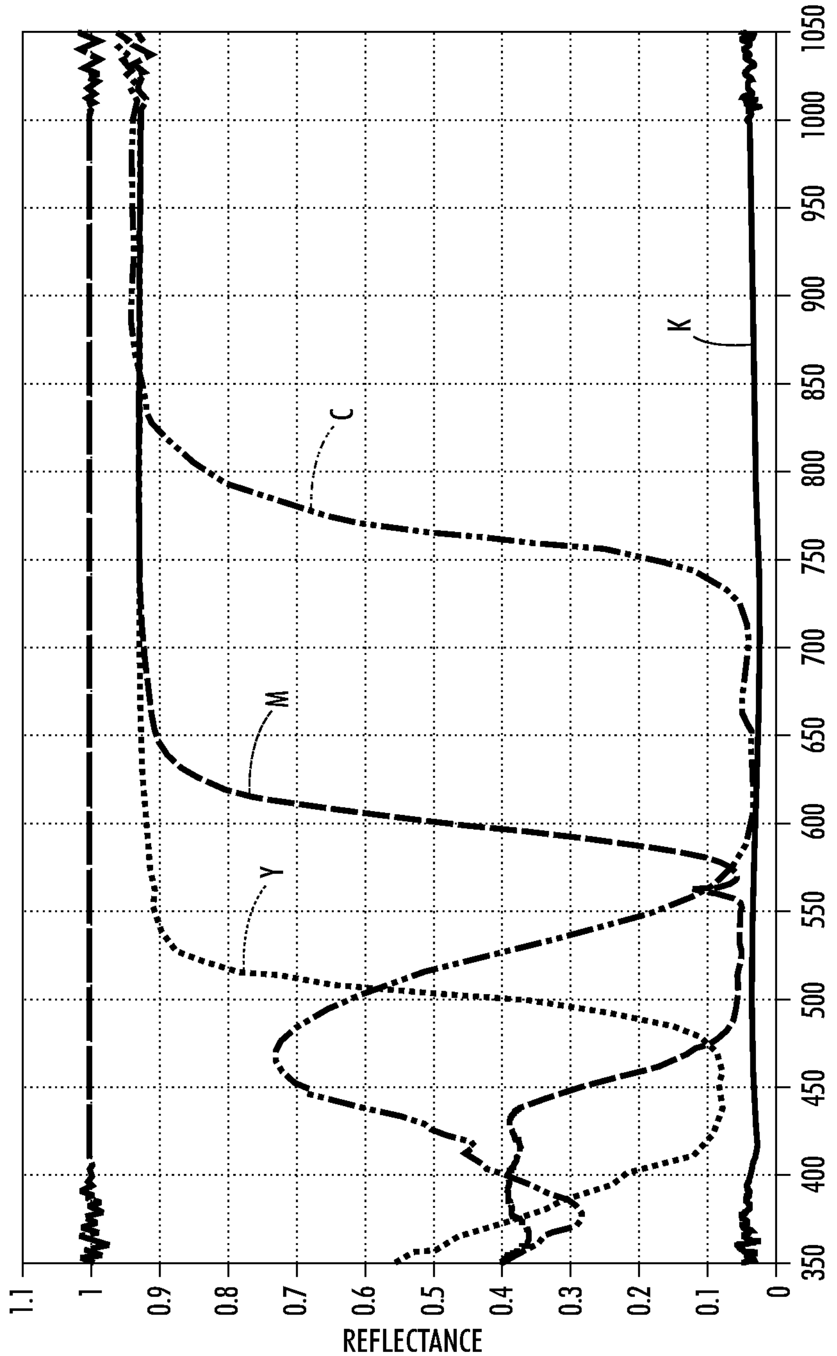
FIG. 4 is a graph showing spectral reflectance of toners between 350 and 1050 nm, indicating the relatively strong separation of CMY toners from the K toner.

Second, the IR response of the different colors is typically linearly related to the K component of the CMYK quadruplet. This is not 100% true, but correction terms needed for the other colorants are commonly smaller by at least one order of magnitude. FIG. 4 shows this for a set of printer toners, where the Spectral Reflectance of the individual colorants is given for Visible and IR. From FIG. 4 it is evident that at 850 nm the CMY colorants each reflect 93+% of the IR light, whereas carbon black K reflectance is on the order of 3%. For comparison, the paper reflectance is marked by the top line, which is essentially constant at 100%.

Third, it is assumed that there is a larger overlap in the permitted toner area coverage for the devices. A larger overlap is directly related to the number of non-unique physical colorant combinations for a given visual color.

The metameric pair sets are then processed to extract a smaller subset that satisfy certain criteria, including bounds on the K difference to ensure an appropriate trade-off between IR signal strength and visibility under normal light, total ink area coverage, and deviation from the neutral axis (303). Thus, with these assumptions it is now possible to select or filter the RGB to CMYK color tables without the need to print large numbers of test sheets. In the first filtering, the number of quadruplets is reduced by only considering $[C_1, M_1, Y_1, K_1]$ and $[C_N, M_N, Y_N, K_N]$ based on the quasi-linear dependence of the IR signal on the K component. In a second step, all CMYK combinations that have toner coverage above a “reasonable” number, say 250%, are eliminated. Here, the criterion for reasonable is commonly associated with physical limitations of the device and known a priori. Total area coverage, for example, influences the physical pile height of toners and the total mass of colorants that is deposited. Again, it is not crucial to have an accurate number, but rather a rough number is sufficient. Alternatively, it would also be possible to filter based on the expected ΔE/ΔE2000 error that is part of the printer model infrastructure.

The two filtering steps outlined above have now resulted in a list of metameric colors that can be sorted by $|K_1-K_N|$, making use of the assumption that the only interest is in relative IR signal strength. Here, another implicit assumption can be incorporated, namely, that all xerographic devices generally have a large overlapping gamut and that the relative strength of the IR signal is maintained over many different products. This view may be confirmed by the fact that past IR colors were in fact identical for the supported devices. It is also understood that SIJ (non-carbon black) and “flash fuse” toners should be considered separately. It is noted that the “common” IR colors refer to common RGB input colors and that the actual physical CMYK colorant values used for rendering will indeed be machine dependent.

The final data is then stored in resource files that link fixed device-independent IR color names to pairs of variable device-dependent colorant values (304). This storage is commonly performed as a “named color” or “spot color” where standard page description language operators allow the mapping of one named color to a specific colorant mixture. In the described case, the two colorant combinations might be called, for example: Color_Name_Hi and Color_Name_Lo for the high and low infrared absorption.

In a VIPP application, an incoming PDL job can contain device-independent calls to IR named colors. For example, in order to create an infrared readable text the following two commands might be given in pseudo-code:

```
rectangle fill Color__Name__Lo
writetext “Hello” with Color__Name__Hi
```

Such an approach would typically generate a rectangle that to a human observer would have the constant appearance of Color_Name, where Color_Name is a descriptive term understandable by a human. The command “writetext” has written into this rectangle a different physical colorant combination Color_Name_Hi that is a metameric match, thus, a human will not perceive a difference in color. Close examination for example with a microscope or other aid might allow a human to trace the outline of the text “Hello”, but to the unaided eye, the string is not or not easily visible.

When the rectangle is examined by an IR sensitive camera the text string “Hello” will be visible as a dark text (high infrared absorption) on a bright background (low infrared absorption). Conversely, if Color_Name_Lo and Color_Name_Hi are reversed in the above pseudo-code, the infrared sensitive camera would see a light text string in a dark field.

Experimental Verification

Based on an exemplary Printer Model, we derived at a set of RGB to $CMYK_1$ and $CMYK_N$ values representing minimal and maximal gray component replacement. Table 1 shows a portion (shown range is 91-87) of a list sorted by $|K_1-K_N|$. For the exemplary Printer Model we printed and examined ΔK numbers in the range of 150 (maximal K difference) to 69 (296 patches), under the assumption that at a ΔK of 69 we would still be dealing with a good IR signal at about 25% of the maximum dynamic range. The selected number of patches can be easily handled for visual examination.

TABLE 1

| L | a | b | C1 | M1 | Y1 | K1 | C2 | M2 | Y2 | K2 |
|---|---|---|---|---|---|---|---|---|---|---|
| 37 | 0 | 5 | 168 | 155 | 173 | 39 | 99 | 73 | 96 | 130 |
| 44 | 8 | −9 | 157 | 158 | 106 | 0 | 102 | 100 | 53 | 90 |
| 35 | 7 | −4 | 167 | 176 | 141 | 38 | 95 | 101 | 67 | 128 |
| 41 | 8 | −9 | 162 | 164 | 112 | 9 | 106 | 102 | 55 | 99 |
| 36 | −7 | −1 | 190 | 147 | 158 | 37 | 132 | 59 | 85 | 126 |
| 34 | 0 | −5 | 185 | 165 | 144 | 41 | 120 | 84 | 68 | 131 |
| 50 | 7 | 2 | 138 | 141 | 127 | 0 | 71 | 83 | 71 | 89 |
| 48 | −8 | 9 | 161 | 120 | 166 | 3 | 108 | 52 | 103 | 93 |
| 47 | −15 | 7 | 177 | 114 | 171 | 0 | 132 | 40 | 109 | 89 |
| 45 | −8 | 9 | 166 | 124 | 171 | 12 | 111 | 54 | 106 | 101 |
| 49 | −1 | 10 | 147 | 130 | 163 | 2 | 87 | 68 | 103 | 91 |
| 46 | −1 | 10 | 151 | 135 | 169 | 11 | 89 | 70 | 105 | 99 |
| 44 | 7 | 7 | 144 | 154 | 157 | 16 | 74 | 90 | 94 | 104 |
| 42 | 14 | −7 | 148 | 173 | 109 | 6 | 85 | 119 | 56 | 95 |
| 35 | 7 | 2 | 162 | 172 | 160 | 45 | 84 | 98 | 83 | 133 |
| 43 | 1 | −10 | 171 | 149 | 109 | 3 | 125 | 87 | 56 | 91 |
| 42 | −8 | 9 | 169 | 127 | 177 | 21 | 115 | 55 | 111 | 109 |
| 47 | −14 | 2 | 179 | 113 | 155 | 0 | 136 | 41 | 96 | 88 |
| 36 | −7 | 4 | 185 | 144 | 175 | 41 | 125 | 55 | 99 | 129 |
| 42 | −7 | −6 | 183 | 135 | 130 | 11 | 136 | 66 | 71 | 99 |
| 38 | 8 | −9 | 166 | 170 | 117 | 20 | 109 | 105 | 56 | 107 |
| 51 | −7 | 4 | 157 | 113 | 143 | 0 | 106 | 47 | 86 | 88 |
| 49 | 0 | −5 | 154 | 126 | 110 | 0 | 103 | 71 | 59 | 87 |
| 45 | 14 | −2 | 139 | 166 | 123 | 5 | 70 | 111 | 67 | 92 |

From examining the patches a few generalizations could additionally be made, reducing the total amount of patches. First, the largest K differences are—as can easily be understood—in the dark neutral colors, but these are also the most difficult to keep stable, as well as the most "boring" in design applications. Thus it is possible to further reduce the patches by eliminating all ΔK>100, as well as all "near neutral" colors.

Described above is an exemplary method of obtaining a set of "universal" RGB (or L*a*b*) colors that have a metameric pair with a reasonable IR response. This "reasonable" response for "universal" colors is preferred over the "optimized" response for "device specific" colors, since it is generally not known to provide a system where the PostScript (or other PDL) constructs have to be changed as a function of print engines. Rather, there is a need for a system that produces a common visual color over all supported machines with a single call and we need that call to have a sufficient IR response to be usable in a system.

However, a similar problem is encountered by all spot color definitions, as, for example: Pantone Water Lily (Pantone #11-0304 TC) or HKS Violett34 (HKS #34).

Thus, alternatively it is possible re-use the standard spot color mechanisms to encode the IR colors with the added caveat that the IR colors are always defined as matched pairs—identical RGB/L*a*b* but different CMYK.

In the VIPP scenario, for example, a common resource may be defined according to:

```
% c m y k colorname --> array for custom color L=40, a= –
21, b=1
0.78 0.42 0.65 0.09 (Xerox_IR_L40aM21b1_Low)
findcmykcustomcolor
/XeroxIR40L exch def
```

-continued

```
0.66 0.16 0.45 0.37 (Xerox_IR_L40aM21b1_Hi)
findcmykcustomcolor
/XeroxIR40H exch def
XeroxIR40L 1 setcustomcolor
36 300 288 144 rectfill
XeroxIR40H 1 setcustomcolor
72 336 220 80 rectfill
```

In the case above, a Xerox_IR_40 color may be defined as a metameric pair of 40L and 40H, i.e., these two colors will look the same to a human observer (resulting in identical L*a*b* values when measured). In the case above, the actual L*a*b* value is part of the color name of L=40, a=−21, b=1 for convenience. The corresponding IR response can be seen from the color definitions, and in this case is roughly 28% of full dynamic rate (|K1−KN|=0.28). In the notation used above, we would say that the common color is Xerox_IR_40 and the two colorant combinations Color_Name_Hi is 40H and Color_Name_Lo is 40L.

Generally, all "names" would stay the same, the actual CMYK values, however, would be different, exactly in the same way that the actual CMYK numbers are different for any named spot color. It is further noted that the color-name inside the PostScript/PDF/PDL file is the same and that the file is thus portable across devices.

An advantage of such a system is that it is thus possible to create "constant" colors that are quasi-optimized for each device while only supporting one PDL construct (one unique color name). Rendering of that color name into an actual CMYK quadruplet is done by the DFE, where the mappings are stored as standard Postscript resources.

It should be understood that terms such as computer program medium, computer executable medium, computer usable medium, and computer readable medium, are used herein to generally refer to media such as main memory and secondary memory, removable storage drive, a hard disk installed in a disk drive, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allows a computer to read such computer readable information.

It should also be understood that the methods described in the flowcharts provided herewith can be implemented on the DFE, a special purpose computer, a microprocessor or micro-controller, an ASIC or other integrated circuit, a DSP, an electronic circuit such as a discrete element circuit, a programmable device such as a PLD, PLA, FPGA, PAL, PDA, and the like. In general, any device or system capable of implementing a finite state machine that is in turn capable of implementing one or more elements of the flow diagrams provided herewith, or portions thereof, can be used. It is also understood that all or parts of the DFE functionality might be separated across different physical machines or different virtual machines that are a part of a dynamic service. Portions of the flow diagrams may also be implemented partially or fully in hardware in conjunction with machine executable instructions.

Furthermore, the flow diagrams hereof may be partially or fully implemented in software using procedural or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method of encoding infrared security watermarks with a set of printing devices, the method comprising:

choosing a set of colors that lies within a common gamut of the set of printing devices and is defined within a device-independent color space, wherein input colors are related to output physical colorant combinations using transformation tables and interpolation between measured values;

for each color in the set of colors and for each printing device in the set of printing devices, obtaining a metameric pair of device colorant values corresponding to minimum and maximum black (K) values is selected;

processing the metameric pair sets to extract a smaller subset of colorant values that satisfies a given set of criteria;

storing data associated with the smaller subset of colorant values that satisfies a given set of criteria in resource files in a database that link fixed device-independent infrared color names to pairs of variable device-dependent colorant values, the data having two distinctly named entries that refer to the same color bit in Lab color space to two different colorant combinations having a differential IR response; and using at least one of the printing devices and the stored data to generate an infrared readable text.

2. The method of claim 1, wherein the chosen set of colors is located at a plurality of nodes of a color transformation table.

3. The method of claim 2, wherein the color transformation table comprises an International Color Consortium table.

4. The method of claim 1, wherein the set of criteria includes at least one of upper and lower bounds on the K difference to maintain a balance between infrared signal strength and visibility under normal light, total ink area coverage, and deviation from a neutral axis.

5. The method of claim 1, wherein the set of colors is expressed by the mapping:

$$\begin{bmatrix} R \\ G \\ B \end{bmatrix} \Rightarrow \left\{ \begin{bmatrix} C_1 \\ M_1 \\ Y_1 \\ K_1 \end{bmatrix}, \begin{bmatrix} C_2 \\ M_2 \\ Y_2 \\ K_2 \end{bmatrix}, \begin{bmatrix} C_3 \\ M_3 \\ Y_3 \\ K_3 \end{bmatrix}, \ldots, \ldots, \begin{bmatrix} C_N \\ M_N \\ Y_N \\ K_N \end{bmatrix} \right\},$$

where $N \geq 1$.

6. The method of claim 5, wherein the metameric pair of device colorant values corresponding to minimum and maximum black comprises $[C,M,Y,K]_1$ and $[C,M,Y,K]_N$.

7. The method of claim 6, wherein processing the metameric pair sets to extract a smaller subset of colorant values that satisfies a given set of criteria further comprises:

in a first filtering, reducing the number of quadruplets by only considering $[C_1, M_1, Y_1, K_1]$ and $[C_N, M_N, Y_N, K_N]$ based on a quasi-linear dependence of an infrared signal on the K component;

in a second filtering, eliminating all CMYK combinations that have toner coverage above a given number.

8. The method of claim 1, wherein the minimum and maximum black values are selected in order to obtain the maximum perceivable infrared signal.

9. The method of claim 1, wherein storing data associated with the smaller subset of colorant values that satisfies a given set of criteria is performed as a named color or spot color where standard page description language operators allow the mapping of one named color to a specific colorant mixture.

10. The method of claim 1, wherein the printing devices comprise xerographic printers.

11. An apparatus for encoding infrared security watermarks with a set of printing devices, the apparatus comprising:

a controller that is operative to:

choose a set of colors that lies within a common gamut of the printing devices and is defined within a device-independent color space, wherein input colors are related to output physical colorant combinations using transformation tables and interpolation between measured values;

for each color in the set of colors and for each printing device in the set of printing devices, obtain a metameric pair of device colorant values corresponding to minimum and maximum black (K) values is selected; and process the metameric pair sets to extract a smaller subset that satisfies a given set of criteria;

a database that stores data associated with the smaller subset that satisfies a given set of criteria in resource files that link fixed device-independent infrared color names to pairs of variable device-dependent colorant values, the data having two distinctly named entries that refer to the same color bit in Lab color space to two different colorant combinations having a differential IR response.

12. The apparatus of claim 11, wherein the chosen set of colors is located at a plurality of nodes of a color transformation table.

13. The apparatus of claim 12, wherein the color transformation table comprises an International Color Consortium table.

14. The apparatus of claim 11, wherein the set of criteria includes at least one of upper and lower bounds on the K difference to ensure an appropriate trade-off between infrared signal strength and visibility under normal light, total ink area coverage, and deviation from a neutral axis.

15. The apparatus of claim 11, wherein the set of colors is expressed by the mapping:

$$\begin{bmatrix} R \\ G \\ B \end{bmatrix} \Rightarrow \left\{ \begin{bmatrix} C_1 \\ M_1 \\ Y_1 \\ K_1 \end{bmatrix}, \begin{bmatrix} C_2 \\ M_2 \\ Y_2 \\ K_2 \end{bmatrix}, \begin{bmatrix} C_3 \\ M_3 \\ Y_3 \\ K_3 \end{bmatrix}, \dots, \dots, \begin{bmatrix} C_N \\ M_N \\ Y_N \\ K_N \end{bmatrix} \right\},$$

where N≥1.

16. The apparatus of claim 15, wherein the metameric pair of device colorant values corresponding to minimum and maximum black comprises $[C,M,Y,K]_1$ and $[C,M,Y,K]_N$.

17. The apparatus of claim 16, wherein processing the metameric pair sets to extract a smaller subset of colorant values that satisfies a given set of criteria further comprises:

in a first filtering, reducing the number of quadruplets by only considering $[C_1, M_1, Y_1, K_1]$ and $[C_N, M_N, Y_N, K_N]$ based on a quasi-linear dependence of an infrared signal on the K component;

in a second filtering, eliminating all CMYK combinations that have toner coverage above a given number.

18. The apparatus of claim 11, wherein the minimum and maximum black values are selected in order to obtain the maximum perceivable infrared signal.

19. The apparatus of claim 11, wherein storing data associated with the smaller subset of colorant values that satisfies a given set of criteria is performed as a named color or spot color where standard page description language operators allow the mapping of one named color to a specific colorant mixture.

20. The apparatus of claim 11, wherein the printing devices comprise xerographic printers.

* * * * *